(12) United States Patent
Chen et al.

(10) Patent No.: US 11,659,553 B2
(45) Date of Patent: May 23, 2023

(54) RADIO SIDELINK COMMUNICATIONS

(71) Applicant: MEDIATEK SINGAPORE PTE. LTD., Singapore (SG)

(72) Inventors: Tao Chen, Beijing (CN); Zhixun Tang, Beijing (CN); Min Lei, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 213 days.

(21) Appl. No.: 17/037,078

(22) Filed: Sep. 29, 2020

(65) Prior Publication Data

US 2021/0105760 A1    Apr. 8, 2021

Related U.S. Application Data

(63) Continuation of application No. PCT/CN2019/109798, filed on Oct. 2, 2019.

(30) Foreign Application Priority Data

Sep. 17, 2020   (CN) .......................... 202010979602.1

(51) Int. Cl.
  *H04W 72/04*    (2009.01)
  *H04L 27/26*    (2006.01)
  *H04W 72/0446*  (2023.01)

(52) U.S. Cl.
  CPC ..... *H04W 72/0406* (2013.01); *H04L 27/2601* (2013.01); *H04W 72/0446* (2013.01)

(58) Field of Classification Search
  CPC .......... H04W 72/0406; H04W 72/0446; H04L 27/2601
  See application file for complete search history.

(56) References Cited

U.S. PATENT DOCUMENTS

| | | | | |
|---|---|---|---|---|
| 2020/0100306 A1* | 3/2020 | Ayaz | ...................... | H04W 76/27 |
| 2020/0187236 A1* | 6/2020 | Moon | .................... | H04L 5/0044 |
| 2020/0396760 A1* | 12/2020 | Yi | .......................... | H04L 1/1864 |
| 2022/0052822 A1* | 2/2022 | Lin | ........................ | H04L 5/0094 |
| 2022/0078760 A1* | 3/2022 | Su | ...................... | H04W 72/0406 |
| 2022/0104238 A1* | 3/2022 | Aiba | ..................... | H04L 5/0053 |

* cited by examiner

*Primary Examiner* — Jasper Kwoh
(74) *Attorney, Agent, or Firm* — Oblon, McClelland, Maier & Neustadt, L.L.P.

(57) ABSTRACT

A method of sidelink communications can include receiving at a user equipment (UE) a configuration for a first resource pool indicating a first size of a first first-stage sidelink control information (SCI) in terms of a number of orthogonal frequency division multiplexing (OFDM) symbols and a second size of the first first-stage SCI in terms of a number of physical resource blocks (PRBs). The first resource pool can be divided into slots in time domain and sub-channels each occupying a set of PRBs in frequency domain. The first first-stage SCI having the first size of the number of OFDM symbols and the second size of the number of PRBs indicated by the configuration for the first resource pool can be transmitted within a first slot and a first sub-channel of the first resource pool.

20 Claims, 11 Drawing Sheets

US 11,659,553 B2

RADIO SIDELINK COMMUNICATIONS

INCORPORATION BY REFERENCE

This present application claims the benefit of Chinese Patent Application No. 202010979602.1 filed on Sep. 17, 2020, which claims the benefit of International Application No. PCT/CN2019/109798, "Synchronization Reference Reselection Procedure Design for V2X Communication" filed on Oct. 2, 2019. The disclosures of the prior applications are incorporated herein by reference in their entirety.

TECHNICAL FIELD

The present disclosure relates to wireless communications, and specifically relates to New Radio (NR) vehicle-to-everything (V2X) sidelink communications.

BACKGROUND

Cellular based vehicle-to-everything (V2X)(e.g., LTE V2X or NR V2X) is a radio access technology developed by the 3rd Generation Partnership Project (3GPP) to support advanced vehicular applications. In V2X, a direct radio link (referred to as a sidelink) can be established between two vehicles. The sidelink can operate under the control of a cellular system (e.g., radio resource allocation being controlled by a base station) when the vehicles are within the coverage of the cellular system. Or, the sidelink can operate independently when no cellular system is present.

SUMMARY

Aspects of the disclosure provide a method of sidelink communications. The method can include receiving at a user equipment (UE) a configuration for a first resource pool indicating a first size of a first first-stage sidelink control information (SCI) in terms of a number of orthogonal frequency division multiplexing (OFDM) symbols and a second size of the first first-stage SCI in terms of a number of physical resource blocks (PRBs). The first resource pool can be divided into slots in time domain and sub-channels each occupying a set of PRBs in frequency domain. The first first-stage SCI having the first size of the number of OFDM symbols and the second size of the number of PRBs indicated by the configuration for the first resource pool can be transmitted within a first slot and a first sub-channel of the first resource pool.

In an embodiment, the number of OFDM symbols indicated by the configuration for the first resource pool includes one of 2 OFDM symbols and 3 OFDM symbols. In an embodiment, the first first-stage SCI starts from a second OFDM symbol of the first slot in time domain. In an embodiment, the first first-stage SCI starts from a lowest PRB of the first sub-channel in frequency domain. In an embodiment, the configuration for the first resource pool is received from a base station or a memory in the UE.

An embodiment of the method can further include receiving at the UE a second configuration for a second resource pool indicating a third size of a second first-stage SCI in terms of a number of OFDM symbols and a fourth size of the second first-stage SCI in terms of a number of PRBs. The second resource pool can be divided into slots in time domain and sub-channels each occupying a set of PRBs in frequency domain. The second first-stage SCI can be received over resources having the third size of the number of OFDM symbols and the fourth size of the number of PRBs indicated by the second configuration for the second resource pool within a second slot and a second sub-channel of the second resource pool. In an example, the number of OFDM symbols indicated by the second configuration for the second resource pool includes one of 2 OFDM symbols and 3 OFDM symbols.

Aspects of the disclosure provide an apparatus comprising circuitry. The circuitry can be configured to receive at a UE a configuration for a first resource pool indicating a first size of a first first-stage SCI in terms of a number of OFDM symbols and a second size of the first first-stage SCI in terms of a number of PRBs. The first resource pool can be divided into slots in time domain and sub-channels each occupying a set of PRBs in frequency domain. The first first-stage SCI having the first size of the number of OFDM symbols and the second size of the number of PRBs indicated by the configuration for the first resource pool can be transmitted within a first slot and a first sub-channel of the first resource pool.

Aspects of disclosure provide a non-transitory computer-readable medium storing instructions that, when executed by a processor, cause the processor to perform the method of sidelink communications.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
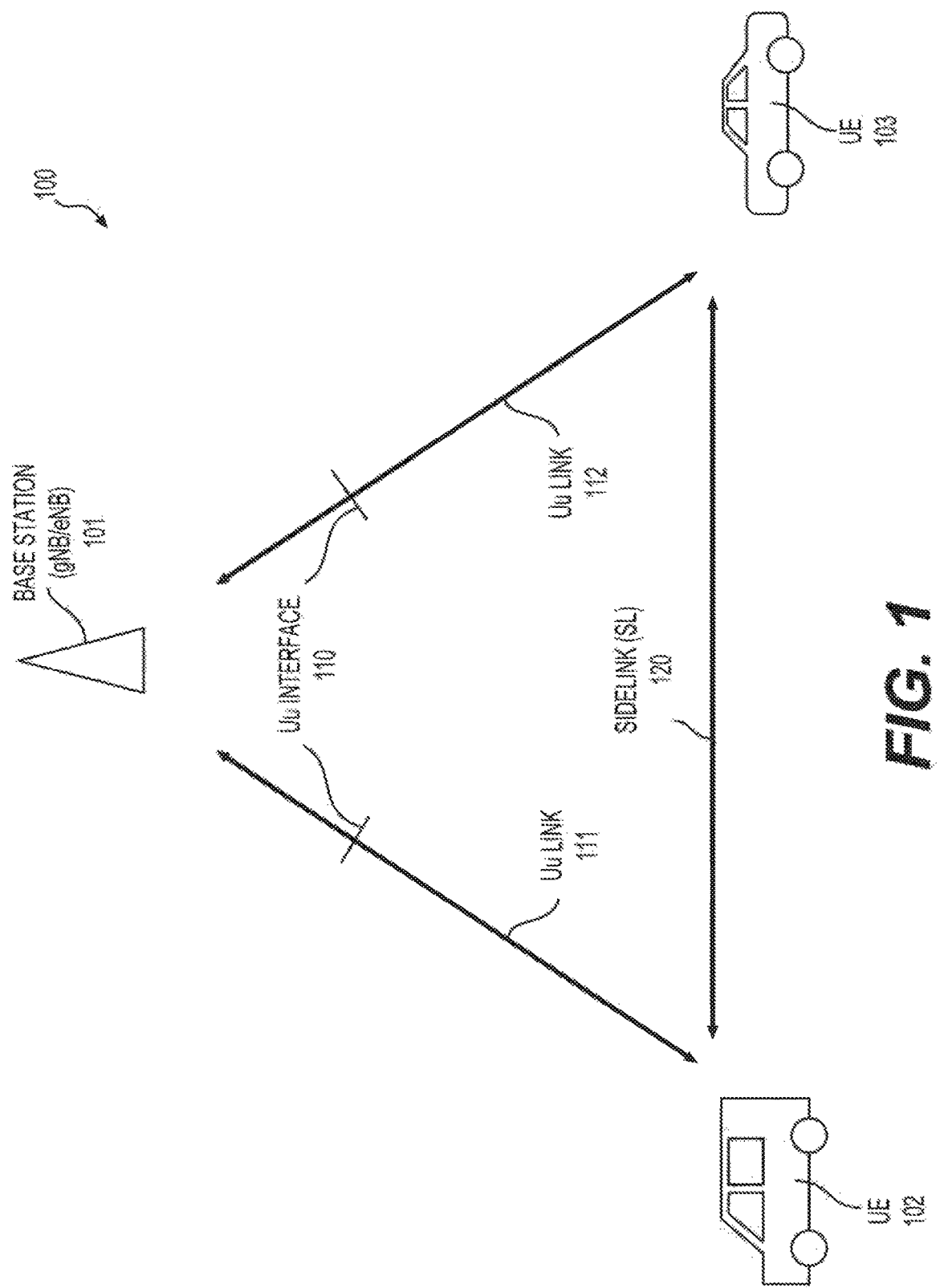
FIG. 1 shows a wireless communication system 100 according to an embodiment of the disclosure.

FIG. 1 shows a wireless communication system 100 according to an embodiment of the disclosure. The system 100 can include a base station (BS) 101, a first user equipment (UE) 102, and a second UE 103. The BS 101 can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS 101 can communicate with the UE 102 or 103 via a radio air interface 110 (referred to as a Uu interface 110) according to respective wireless communication protocols. In other examples, the BS 101 may implement other types of standardized or non-standardized radio access technologies, and communicate with the UE 102 or 103 according to the respective radio access technologies. The UE 102 or 103 can be a vehicle, a computer, a mobile phone, a roadside unit, and the like.

The UEs 102 and 103 can communicate with each other based on vehicle-to-everything (V2X) technologies, for example, as specified in 3GPP standards. A direct radio link 120, referred to as a sidelink (SL), can be established between the UEs 102 and 103. The sidelink 120 can be either a sidelink from the UE 102 to the UE 103, or a sidelink from the UE 103 to the UE 102. For the UE 102, uplink transmissions over a Uu link 111 and sidelink transmissions over the sidelink 120 can share a same spectrum (e.g., a same component carrier). Similarly, for the UE 103, uplink transmissions over a Uu link 112 and SL transmissions over the sidelink 120 can share a same spectrum (e.g., a same component carrier). In addition, allocation of radio resources over the sidelink 120 can be controlled by the BS 101.

Different from the FIG. 1 example (in-coverage scenario) where the UEs 102 and 103 performing sidelink communications are under network coverage (the coverage of a cell of the BS 101), in other examples, UEs performing sidelink communications can be outside of network coverage. For example, a sidelink can be established between two UEs both of which are located outside of network coverage (out-of-coverage scenario), or one of which is located outside of network coverage (partial-coverage scenario).

In some examples, a group of UEs (such as the UEs 102 and 103 and other UEs (not shown)) in a local area may communicate with each other using sidelinks under or without control of a base station. Each UE in the group may periodically or aperiodically transmits messages to neighboring UEs. In addition, the respective transmissions can be of a type of unicast, groupcast, or broadcast. For example, hybrid automatic repeat request (HARQ) and link adaptation mechanisms can be employed to support unicast or groupcast between a transmission (Tx) UE and a reception UE(s).

Figure 2:
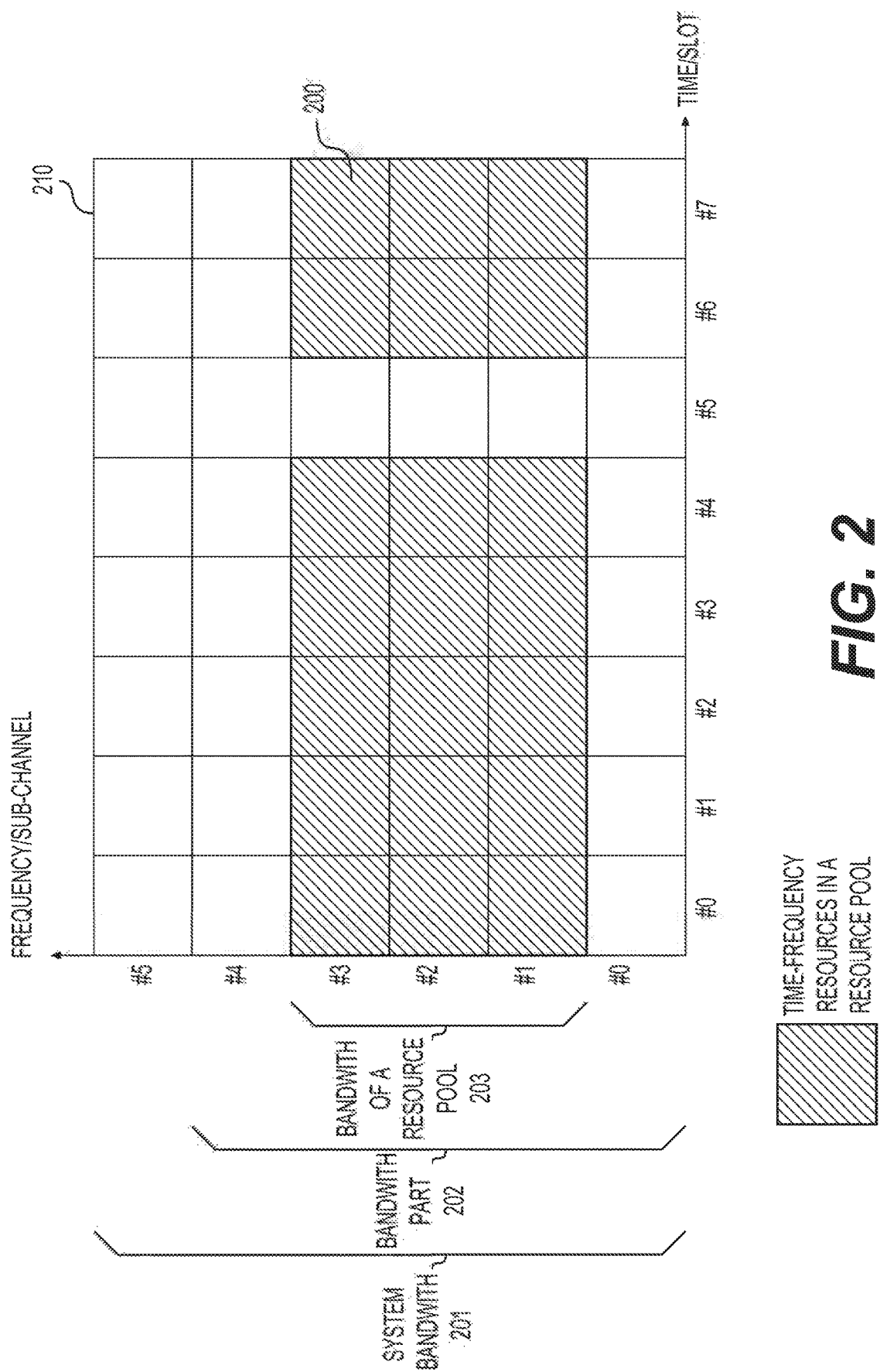
FIG. 2 shows a resource pool 200 configured for sidelink communications according to an embodiment of the disclosure.

FIG. 2 shows an example of a resource pool 200 configured for sidelink communications according to an embodiment of the disclosure. For example, the resource pool 200 can be configured to the UE 102 from the BS 101, or can be pre-configured to the UE 102 (e.g., a resource pool configuration is stored in a universal integrated circuit card (UICC) of the UE 102). The resource pool 200 can be defined over a time-frequency (slot/sub-channel) resource grid 210. Radio resources for transmission of physical channels (e.g., physical sidelink control channel (PSCCH), physical sidelink shared channel (PSSCH), and the like) from the UE 102 on the sidelink 120 can be allocated based on the resource pool 200.

As shown, a system bandwidth 201 of the UE 102 can include sub-channels #0-#5. Each sub-channel may include a number of physical resource blocks (PRBs, or RBs)(e.g., 5, 10, or 20 PRBs). The resource pool 200 can include a set of consecutive (or non-consecutive) sub-channels #1-#3 in frequency domain. Each sub-channel can include N number of PRBs. For example, the number N can be 5, 10, 15, 20, 25, 50, 75, or the like. If the UE 102 operates in a bandwidth part (BWP) 202, a bandwidth 203 of the resource pool 200 can be configured to be within the BWP 202. In time domain, the resource pool 200 can include a number of slots (e.g., slots #0-#4 and #6-#7) that can be consecutive or non-consecutive in different examples.

Resource pools can be (pre-)configured to the UE 102 separately from the transmission perspective (Tx pools) and the reception perspective (Rx pools). Accordingly, the UE 102 can monitor for PSCCHs, and hence receive respective PSSCH transmissions from other UEs in a Rx pool while performing transmissions in a Tx pool.

In an embodiment, within each of the slots of the resource pool 200, there can be from 7 to 14 of the symbols reserved for sidelink operation, of which PSSCH can be transmitted in 5 to 12 symbols, respectively. The remaining sidelink symbols in each slot (not used for PSSCH transmission) can transmit physical sidelink feedback channel (PSFCH), automatic gain control (AGC) symbol(s), guard period (GP) symbol(s), or uplink or downlink symbols.

In an embodiment, two resource allocation modes (Mode 1 and Mode 2) can be used for allocating radio resources for PSCCH and PSSCH transmissions over a sidelink. In Mode 1, the BS 101 performs the function of resource scheduling. For example, the BS 101 can provide dynamic grants of sidelink resources, or semi-statically configured grants of periodic sidelink resources (referred to as sidelink configured grants) to the UE 102 for sidelink communications over the sidelink 120.

A dynamic sidelink grant can be provided in a downlink control information (DCI), and schedule resources for an initial transmission of a transport block, and optionally, retransmissions of the same transport block. The retransmissions can be blindly repeated transmissions, or can be retransmissions in response to a HARQ feedback. In one example, resources for each transmission or retransmission can be spanned over one or more sub-channels but limited within one slot in the sidelink resource pool 200.

For a sidelink configured grant, the scheduled resources can be a set of sidelink resources recurring with a periodicity to accommodate periodically transmitted messages. Two types of configured grant are defined in an example. The Type 1 configured grant can be configured once (e.g., by radio resource control (RRC) signaling) and used by the UE 102 immediately until being released by RRC signaling. The Type 2 configured grant can be configured once. Activation or deactivation signaling via a DCI can be employed to start or terminate usage of the Type 2 configured grant Multiple configured grants can be configured to allow provision for different services, traffic types, etc.

In an embodiment, modulation and coding scheme (MCS) information for dynamic and configured grants can optionally be provided or constrained by RRC signaling instead of traditional DC. RRC can configure an exact MCS, or a range of MCS. In an example, RRC does not provide the exact MCS, a transmitting UE can select an appropriate MCS itself based on the knowledge of a transport block (TB) to be transmitted and, potentially, sidelink radio conditions.

When the UE 102 is in an out-of-coverage status, or the UE 102 is in an in-coverage status but instructed by the BS 101, Mode 2 can be employed for resource scheduling (resource allocation). In Mode 2, the UE 102 can autonomously select resources for sidelink transmissions based on a sensing procedure. For example, the UE 102 can sense, within a (pre-)configured resource pool, which resources are not in use by other UEs with higher-priority traffic, and select an appropriate amount of resources for sidelink initial transmissions and, optionally, retransmissions. In the selected such resources, the UE 102 can transmit and re-transmit a certain number of times.

For example, the UE 102 can reserve resources to be used for a number of blind (re-)transmissions or HARQ-feedback-based (re-)transmissions of a transport block. The UE 102 can also reserve resources to be used for an initial transmission of a later transport block. The reserved resources can be indicated in a sidelink control information (SCI) scheduling a transmission of a transport block. Alternatively, an initial transmission of a transport block can be performed after sensing and resource selection, but without a reservation.

SCIs (e.g., 1st-stage SC) transmitted by UEs on PSCCH indicate selected (or reserved) time-frequency resources in which the respective UE will transmit a PSSCH. The indicated time-frequency resources can be allocated with either Mode 1 or Mode 2. These SCI transmissions can be used by sensing UEs to maintain a record of which resources have been reserved by other UEs in the recent past. When a resource selection is triggered (e.g. by traffic arrival or a resource re-selection trigger), the UE 102 (while performing sensing) considers a sensing window which starts a (pre-)configured time in the past and finishes shortly before the trigger time. The sensing UE 102 also measures, for example, the PSSCH reference signal received power (RSRP) over selected or reserved resources in the slots of the sensing window. The measurements can indicates a level of interference which would be experienced if the sensing UE 102 were to transmit in the selected or reserved resources.

The sensing UE 102 can then select resources for transmission(s) or retransmission(s) from within a resource selection window. For example, the resource selection window starts after the trigger for transmission, and cannot be longer than a remaining latency budget of a to-be-transmitted transport block. Based on the SCIs from the other UEs and the measurements as described above, selected or reserved resources by the other UEs in the selection window with PSSCH-RSRP above a threshold are excluded from being candidates by the sensing UE 102. The threshold can be set according to priorities of the traffic (e.g., priorities associated with respective transport blocks) of the sensing UEs and the other transmitting UEs. Thus, a higher priority transmission from the sensing UE 102 can occupy resources which are reserved by a transmitting UE with sufficiently low PSSCH-RSRP and sufficiently lower-priority traffic.

In an example, from the set of resources in the selection window which have not been excluded, the sensing UE can identify a certain percentage (e.g., 20%) of the available resources within the window as candidate resources. The UE 102 may select from the candidate resources for a number of initial- or re-transmissions of the to-be-transmitted transport block, for example, in a random way.

Figure 3:
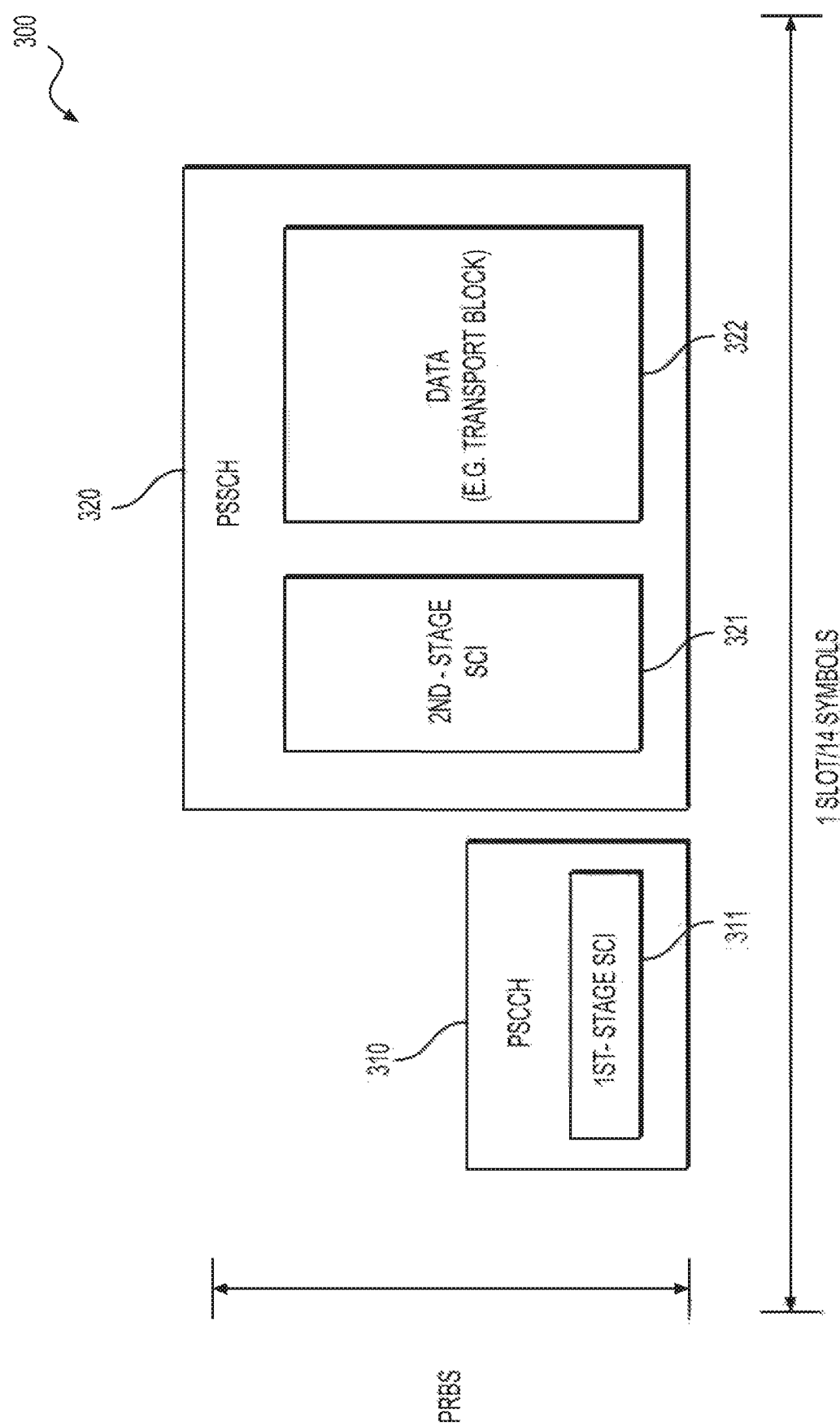
FIG. 3 shows a sidelink transmission 300 with a two-stage sidelink control information (SCI) according to an embodiment of the disclosure.

FIG. 3 shows an example of a sidelink transmission 300 with a two-stage SCI according to an embodiment of the disclosure. In the sidelink transmission 300, a PSCCH 310 and a PSSCH 320 associated with the PSCCH 310 can be generated and transmitted from the UE 102. The PSCCH 310 can carry a 1st-stage SCI 311, while the PSSCH 320 can carry a 2nd-stage SCI 321 and data 322 (e.g., data of a transport block and optionally other type of data). For example, the 1st-stage or 2nd-stage SCI can be generated and processed (e.g., channel coding, modulation, precoding, and the like) at a physical layer before being mapped to resource elements (REs) in the respective physical channels (e.g., PSCCH 310 or PSSCH 320). The transport block can be received from a higher layer (e.g., medium access control (MAC) layer) and processed (e.g., channel coding, modulation, precoding, and the like) at the physical layer before being mapped to REs in the respective PSSCH 320.

In one example, the UE 102 can be configured to perform each transmission or retransmission of a transport block or other type of data within a slot in time domain. Accordingly, as shown in FIG. 3, resources for transmitting PSCCH 310 and PSSCH 320 can be selected in a Tx resource pool within a slot in time domain and one or more sub-channels in frequency domain. In an example, a slot may include 14 symbols (e.g., orthogonal frequency division multiplexing (OFDM) symbols) but may have different duration depending on respective sub-carrier spacings. For example, corresponding to different sub-carrier spacings 15 kHz, 30 kHz, or 60 kHz, a 1-ms subframe may include 1, 2, or 4 slots each including 14 symbols.

In other examples, the PSCCH 310 and the PSSCH 320 may be transmitted in different slots. Accordingly, resources for transmitting PSCCH 310 and PSSCH 320 can be selected from different slots in a Tx resource pool.

In FIG. 3, the PSCCH 310 and the PSSCH 320 are shown to be time-division multiplexed (TDMed). However, in other examples, the PSCCH 310 and the PSSCH 320 can be frequency-division multiplexed (FDMed). For example, within the bandwidth of the assigned sub-channels in FIG. 3, the resources above the PSCCH 310 can also be assigned for transmission of the PSSCH 320.

Figure 4:
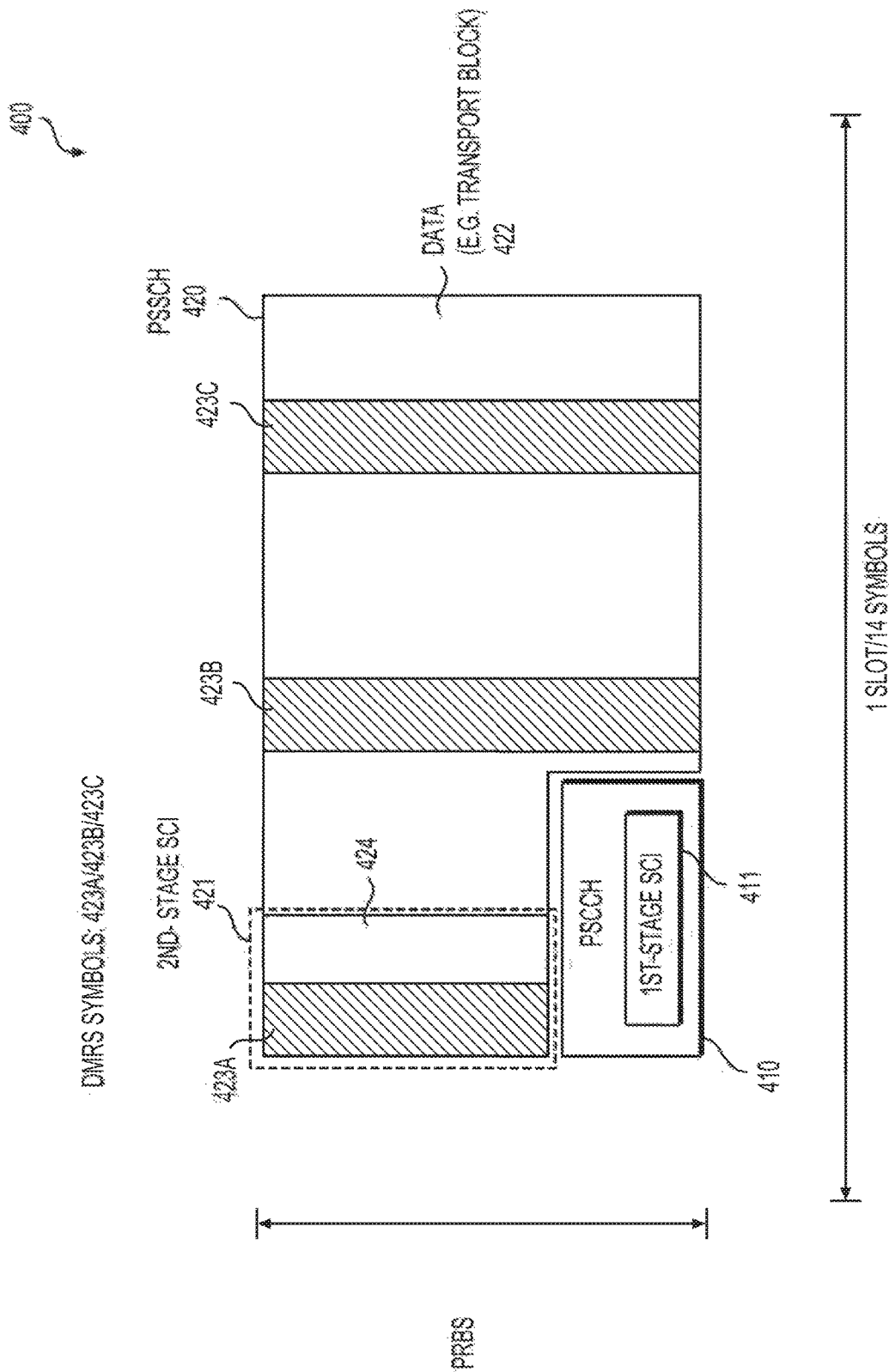
FIG. 4 shows another sidelink transmission 400 with a two-stage SCI according to an embodiment of the disclosure.

FIG. 4 shows another example of a sidelink transmission 400 with a two-stage SCI according to an embodiment of the disclosure. In the sidelink transmission 400, a PSCCH 410 and an associated PSSCH 420 can be generated and transmitted from the UE 102. The PSCCH 410 can carry a 1st-stage SCI 411, while the PSSCH 420 can carry a 2nd-stage SCI 421 and data 422 (e.g., data of a transport block). Similar to the FIG. 3 example, time-frequency resources for transmitting PSCCH 410 and the PSSCH 420 can be selected to be within a slot in time domain and one or more sub-channels in frequency domain in a Tx resource pool. Different from the FIG. 3 example, the PSSCH 420 is TDMed and FDMed with the PSCCH 410.

In addition, as shown in FIG. 4, the PSSCH 420 can be multiplexed with a demodulation reference signal (DMRS) mapped in several symbols 423A, 423B, and 423C (referred to as DMRS symbols). In an example, PRBs in the DMRS symbols can each include REs in which the DMRS is mapped. The REs carrying the DMRS in one DMRS symbol may form a comb-alike structure in some examples. REs without carrying the DMRS in one DMRS symbol can be used to carry the 2nd-stage SCI 421 or the data 422.

Two-stage SCI is used for sidelink transmission in the examples of FIG. 3 and FIG. 4. The corresponding sidelink transmissions 300 or 400 can be of a type of unicast, groupcast, or broadcast. During the transmissions 300/400, the 1st-stage SCI 311/411 can be employed for sensing purpose and carry information related to channel sensing. The 1st-stage SCI 311/411 can also carry information of resource allocation of the respective PSSCH 320/420.

The 2nd-stage SCI 321/421 can carry information (e.g., new data indicator, and redundancy version (RV)) needed for identifying and decoding the data 322/422, controlling HARQ procedures, triggering channel state information (CSI) feedback, and the like. The 2nd-stage SCI 321/421 can be transmitted with link adaptation based on channel conditions between the Tx UE 102 and the target UEs. For example, a high coding rate may be used for transmitting the 2nd-stage SCI 321/421 to improve spectra efficiency. The high coding rate can be determined based on a signal to noise ratio (SNR) level of channels between the Tx UE 102 and the target UEs. In an example, polar code is used for channel coding of the 2nd-stage SCI 321/421.

Figure 5:
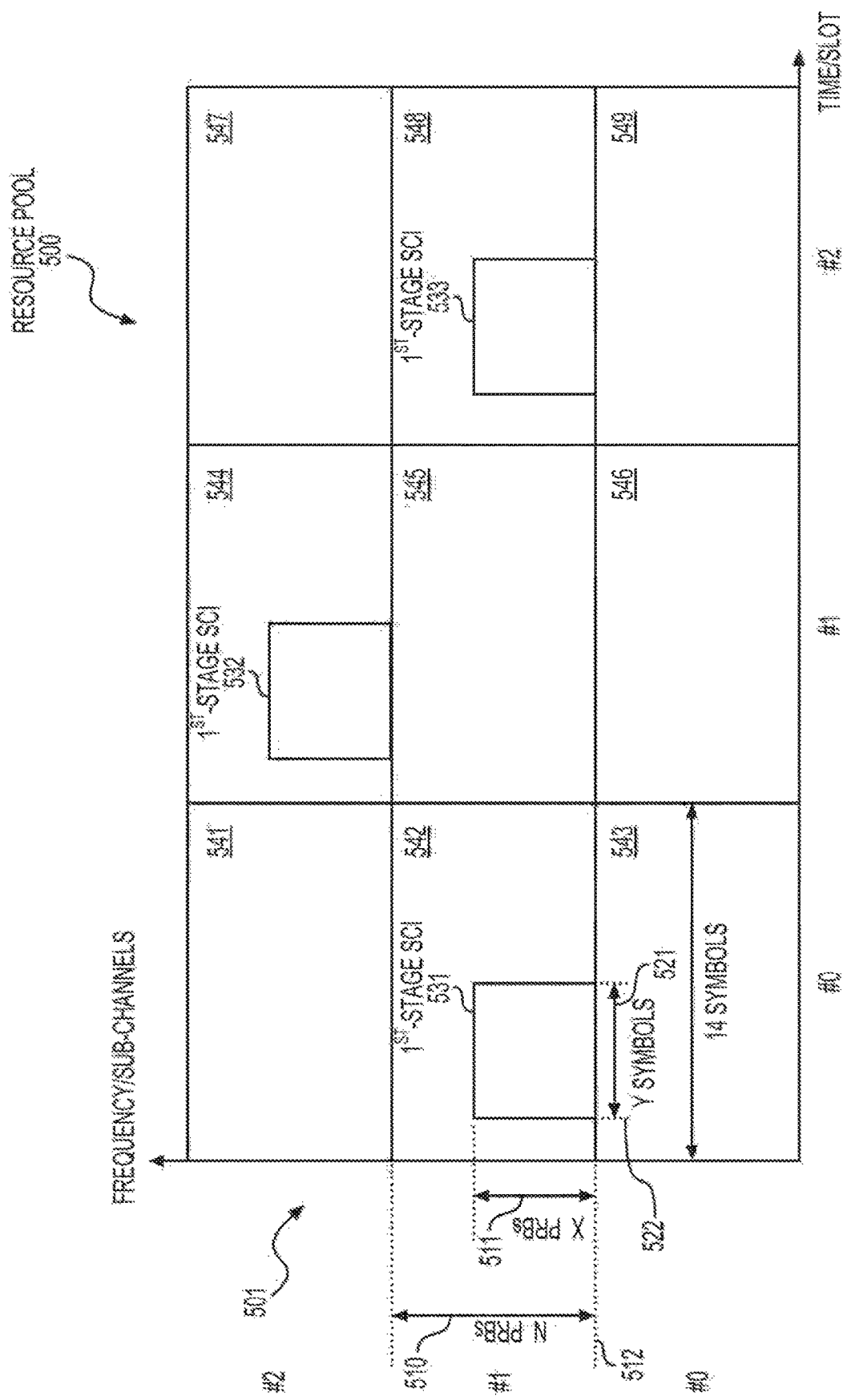
FIG. 5 shows an example of a 1st-stage SCI configuration 501 over a resource pool 500 according to an embodiment of the disclosure.

FIG. 5 shows an example of a 1st-stage SCI configuration 501 over a resource pool 500 according to an embodiment of the disclosure. In FIG. 5, the resource pool 500 include 9 time-frequency resource grid 541-549 distributed in 3 slots (#0-#2) in time domain and in 3 sub-channels (#0-#2) in frequency domain. Each slot can include 14 OFDM symbols indexed from 0 to 13. Each of the sub-channels (#0-#2) can have a size 510 of N PRBs. Three 1st-stage SCIs 531-533 are shown being transmitted in three different slots (#0-#2).

The 1st-stage SCI configuration 501 is described using the 1st-stage SCI 531 as an example. Specifically, the 1st-stage SCI configuration 501 can specify a time-frequency location of the 1st-stage SCI 531. For example, the time-domain location of the 1st-stage SCI 531 can be specified by a starting position 522 and a size 521 in time domain, while the frequency-domain location of the 1 st-stage SCI 531 can be specified by a starting position 512 and a size 511 in frequency domain.

In an embodiment, the time-domain starting position 522 can be the second symbol (with the index of 1, not shown) within the slot #0. The first symbol (with the index of 0, not shown) may be used for AGC purpose. For example, signals over the second symbol may be copied into the first symbol in the time-frequency resource grid 542. Or, a DMRS used for PSSCH may be transmitted in the first symbol in the time-frequency resource grid 542. In other examples, the time-domain starting position 522 can be the K-th symbols of the slot #0. K can be an integer other than 1. For example, K can be 0, 2, 3, or the like.

The time-domain size 521 can be Y number of the symbols within the slot #0. Y is an integer, and can be a number in a range from 1 to 12. In some examples, to reduce decoding delay of 1st-stage SCI, the time-domain size 521 can be limited to be 2 or 3 symbols.

In various embodiments, the frequency-domain starting position 512 can be the lowest PRB of the sub-channel #1 in terms of indices associated with each PRB, or can be a PRB higher than the lowest PRB of the sub-channel #1. In an example, the frequency-domain starting position 512 can be the lowest PRB of a PSSCH scheduled by the 1st-stage SCI 531. Depending on configuration, the lowest PRB of the PSSCH can be the lowest PRB of the sub-channel #1, or can be a PRB higher than the lowest PRB of the sub-channel #1.

The frequency-domain size 511 can be X number of PRBs. In an example, the frequency-domain size 511 is smaller than or equal to the size 510 of the sub-channel #1. Accordingly, the 1st-stage SCI 531 is within the sub-channel #1 in frequency domain. In other examples, the 1st-stage SCI 531 may span over PRBs belonging to more than one sub-channels.

In an embodiment, the 1st-stage SCI configuration 501 as describe above can be included in a first resource pool configuration signaled from the BS 101 to the UE 102. The first resource pool configuration can indicate the resource pool 500 as a Tx resource pool for the UE 102. The first resource pool configuration can include information defining the Tx resource pool in addition to information of the 1st-stage SCI configuration 501. Accordingly, the UE 102 can perform sidelink transmissions using resources in the Tx resource pool. The resources can be scheduled by the BS 101 or allocated by the UE 102 itself.

On the other side, the BS 101 can signal a second resource pool configuration for a Rx resource pool to the UE 103. The second resource pool configuration can indicate the resource pool 500 as the Rx resource pool. In addition, the second resource pool configuration can also include the 1st-stage SCI configuration 501. Accordingly, the UE 103 can know candidate time-frequency locations of a 1st-stage SCI transmitted over sub-channels within a slot of the resource pool 500 while trying to blindly decode the 1st-stage SCI.

Specifically, in an example, positions and sizes of the resource grids 541-549 belonging to the resource pool 500 can be defined by the respective first and second resource pool configurations. Or, the positions and sizes of the resource grids 541-549 can be standardized. In an example, the resource grids 541-549 can have an equal size.

Configured by the first and second resource pool configurations, or standardized, there is at most one 1st-stage SCI transmitted in each of the slots (#0-#2) of the resource pool 500. Each 1st-stage SCI can be restricted to be within one resource grid. A time-frequency location of each 1st-stage SCI, when transmitted in a respective resource grid, can be determined according to the 1st-stage SCI configuration 501 included in the first and second resource pool configurations.

Accordingly, the UE 102 can perform sidelink transmissions over the resource grids 542, 544, and 548, and transmit the 1st-stage SCIs 531-533 at respective time-frequency locations as specified by the 1st-stage SCI configuration 501. The UE 102 can perform 1 st-stage SCI receiving (blind decoding), for example, over candidate time-frequency locations at resource grids 543, 542, and 541 in slot #0. The candidate time-frequency locations at each resource grids 543, 542, and 541 can be determined according to the 1st-stage SCI configuration 501. In an example, blind investigation of the candidate time-frequency locations in the resource grids 543, 542, and 541 can be carried out according to an order (e.g., from resource grid 543 to resource grid 541). Once the 1st-stage SCI 531 is correctly decoded (e.g., by cyclic redundancy checking (CRC) validation), the blind decoding process over the slot #0 can be ended.

While the first or second resource pool configuration is signaled from the BS 101 to the UE 102 or 103, respectively, in the above example, the first or second resource pool configuration can be preconfigured to the UE 102 or 103, respectively, by storage of the first or second resource pool configuration at the UE 102 or 103, respectively.

Figure 6:
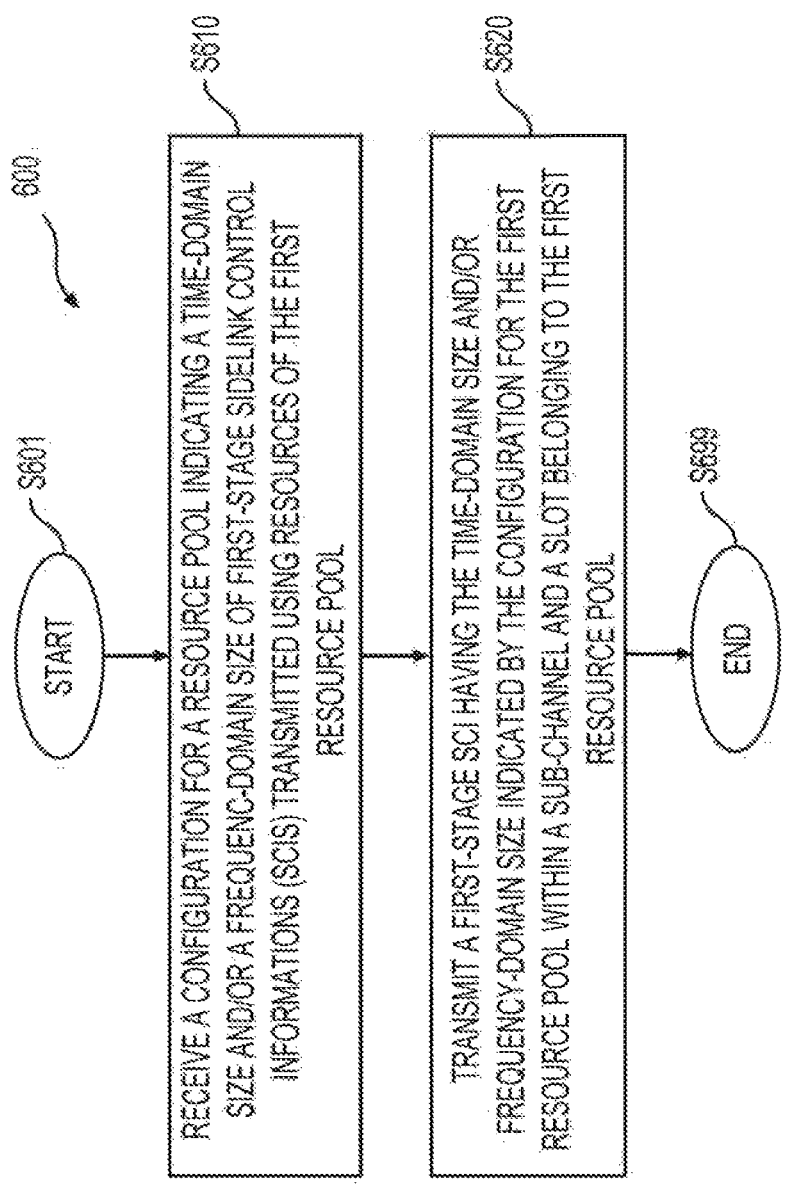
FIG. 6 shows a process 600 of sidelink transmissions according to an embodiment of the disclosure.

FIG. 6 shows a process 600 of sidelink transmissions according to an embodiment of the disclosure. The process 600 can be performed at the UE 102 in the FIG. 1 example. The process 600 can start from the S601, and proceeds to S610.

At S610, a resource pool configuration for a Tx resource pool can be received at the UE 102. The resource pool configuration can indicate a 1st-stage SCI configuration. For example, the resource pool configuration can indicate a time-domain size of 1st-stage SCIs transmitted over resource grids of the Tx resource pool. In an example, the time-domain size of the 1st-stage SCIs can be 2 or 3 symbols in a slot. In addition, the resource pool configuration can additionally or optionally indicate a frequency-domain size of the 1st-stage SCIs. For example, the frequency-domain size of the 1st-stage SCIs can be 5, 10, 15, 20, 25, 50, or 100 PRBs in a sub-channel. The 1st-stage SCIs transmitted over the resources of the Tx resource pool can have a predefined time-domain starting position (e.g., start from the second symbol of a respective slot), and a predefined frequency-domain starting position (e.g., the lowest PRB of a respective sub-channel). Thus, the time-domain and frequency-domain starting position information can excluded from the resource pool configuration.

At S620, a 1st-stage SCI can be transmitted from the UE 102 over a sub-channel and a slot of the Tx resource pool according to the 1st-stage SCI configuration included in the resource pool configuration. For example, scheduled by the BS 101 or allocated by the UE 102 itself, the sub-channel and slot for transmitting the 1st-stage SCI and a PSSCH associated with the 1st-stage SCI can be determined. The 1st-stage SCI transmitted can have the time-domain size and the frequency-domain size as indicated in the resource pool configuration received at S610. In addition, within the respective resource grid, the 1st-stage SCI transmitted can be located at a position corresponding to the predefined time-domain and frequency-domain starting positions. The process 600 can proceed to S699, and terminates at S699.

In some embodiments, for data transmission with indications of an L1 source ID and/or an L1 destination ID, the partial L1 source and/or destination ID can be carried in a 1st-stage SCI. In an example, the partial L1 source or destination ID can be further used for PSSCH DMRS sequence generation. In an example, the remaining L1 source and/or destination ID can be carried in a 2nd-stage SCI associated with the 1st-stage SCI. In an example, the remaining L1 source and/or destination ID can be partially or fully scrambled by CRC in the 2nd-stage SCI. For example, the remaining source ID is scrambled in the 2nd-stage SCI CRC. Or, the remaining destination ID is scrambled in the 2nd-stage SCI CRC. Or, the remaining source ID and destination ID are both scrambled in the 2nd-stage SCI CRC.

In some embodiments, HARQ feedback from Rx UEs is applied in groupcast transmissions performed by a Tx UE. Power control can be applied for a PSFCH to secure that the Tx UE can properly receive the HARQ feedback correctly. In this case, a Tx power can be indicated by the Tx UE in an SCI (e.g., 1st-stage SCI or 2nd-stage SCI in case of 2-stage SCI). A Rx UE can derive a sidelink path loss based on the indicated Tx power and the received signal strength (e.g., RSRP). For example, the pathloss can be determined as follows:

SL Pathloss=Tx Power−RSRP.

Accordingly, the Rx UE can transmit the PSFCH according to a power control equation by applying the derived SL pathloss to mitigate the near-far problem. The Tx UE or a SIB/RRC signaling can indicate power control parameters, such as alpha, PO parameters, for the groupcast power control to Rx UEs.

Figure 7:
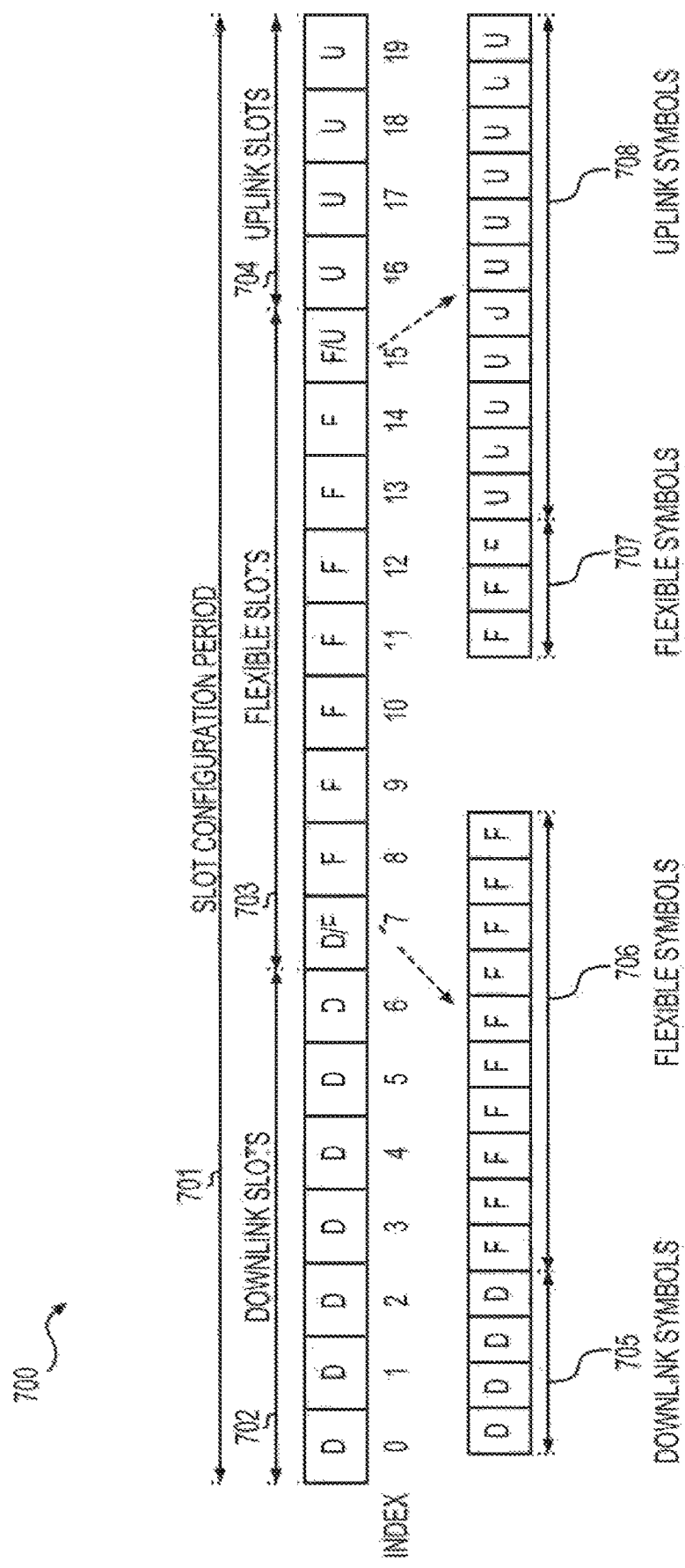
FIG. 7 shows an example time division duplex (TDD) uplink (UL) downlink (DL) pattern 700.

FIG. 7 shows an example time division duplex (TDD) uplink (UL) downlink (DL) pattern 700. For example, the system 100 in the FIG. 1 example can operate in a TDD mode. Accordingly, the BS 101 can signal to the UEs 102 and 103 a TDD UL DL configuration over the Uu interface 110, for example, by signaling of a system information block (SIB) broadcast in the cell of the BS 101. The TDD UL DL configuration can indicate the TDD UL DL pattern 700, such that the UEs 102 and 103 can have knowledge of which resources (e.g., slots or symbols) can be used for uplink or downlink transmissions.

The pattern 700 can be within a slot configuration period 701 over a number of slots (indexed from 0 to 19), and transmitted periodically. The pattern 700 may include downlink slots 702 dedicated to downlink transmissions, and uplink slots 704 dedicated to uplink transmissions. In addition, the pattern 700 may further include a set of flexible slots 703 each include flexible symbols. The flexible symbols can be used for uplink or downlink transmissions or served as a guard period for downlink-uplink transition depending on a further configuration (e.g., a dedicated RRC signaling for a specific UE). As shown, the first flexible slot (with the slot index of 7) can include downlink symbols 705 and flexible symbols 706. The last flexible slot (with the slot index of 15) can include flexible symbols 707 and uplink symbols 708.

In an embodiment, the uplink slots 704 can be treated by the UE 102 as available resources (or candidate resources) for sidelink transmissions over the sidelink 120. For example, all or a part of the uplink slots 704 can be used by the UE 102 for sidelink transmissions. Accordingly, the UE 102 may signal the pattern 700 to a destination UE(s) out of coverage of the BS 101, such that the destination UE can have knowledge of the available sidelink resources (the uplink slots 704 with the period 701). The pattern 700 can be signaled via a sidelink SIB, a sidelink RRC message, a physical sidelink broadcast channel (PSBCH), or the like to the target UE(s).

In case of signaling the pattern 700 using the PSBCH, a confusion may arise due to a limited payload size of a PSBCH. For example, due to the flexibility of the TDD DL UL configuration, there can be numerous TDD DL UL patterns. Accordingly, a large number of bits (e.g., more than 3 bits) may be needed to unambiguously identify a specific pattern. However, the PSBCH typically cannot provide that number of bits for identifying a specify pattern due to a small payload size of the PSBCH.

In an embodiment, to solve the above problem of identifying a specific TDD DL UL pattern with limited amount of bits in a PSBCH, a signaling separate from the TDD DL UL configuration on the Uu interface 110 can be provided to facilitate indicating available sidelink resources (e.g., uplink slots/symbols in a pattern) via a PSBCH. Specifically, a limited number of patterns (referred to as TDD SL patterns) for indicating available sidelink resources (e.g., uplink slots) can be defined and configured to the UEs 102 and 103. Each TDD SL pattern can correspond to multiple TDD DL UL patterns (e.g., the pattern 700) and be derived from the multiple TDD DL UL patterns. For example, each TDD SL pattern can include a subset of UL slots in each of the corresponding multiple TDD DL UL patterns. For example, a TDD SL pattern corresponding to the pattern 700 can include the UL slots having slot indices of 16-18 in the pattern 700. A total number of the TDD SL patterns can be limited to a small amount, such as 8. Therefore, three bits are sufficient for identifying each of the TDD SL patterns.

The separate signaling can be a transmission of a TDD SL configuration over the Uu interface 110 to indicate a certain TDD SL pattern, for example, by indicating an index of the TDD SL pattern. The UE 102 receives the TDD SL configuration, and can accordingly broadcast the TDD SL pattern in a field of the PSBCH. The field can, for example, have a size of 3 bits. The TDD SL configuration can be transmitted over the Uu interface 110, for example, by a broadcast control channel (e.g., a SIB message) in the cell of the BS 101, or a dedicated RRC signaling (e.g., an RRC message) to UEs within the coverage of the BS 101.

In an example, the PSBCH of the UE 102 can be transmitted in a sidelink synchronization signal block (S-SSB). The S-SSB can include a sidelink primary synchronization signal (S-PSS), a sidelink secondary synchronization signal (S-SSS), and the PSBCH that are each transmitted over one or more symbols within a slot over the sidelink 120. In addition, the S-SSB can be transmitted repeatedly with a certain period. In case beamforming is employed, a burst set of S-SSBs can be transmitted in a manner of beam sweeping. The burst set of S-SSBs can be transmitted with a certain period. In such a scenario, the TDD SL pattern can be indicated in each burst set of the S-SSB.

In some embodiments, available sidelink resources can be preconfigured to a UE (e.g., stored in the UE) or can be indicated to a UE through a broadcast channel (e.g., a SIB message for sidelink configuration over a Uu interface) or a dedicated RRC message. The available sidelink resources can be described with a sidelink slot bitmap.

In an embodiment, a sidelink slot bitmap can be defined over a series of slots within a period. Each bit of the sidelink slot bitmap corresponds to a slot. Each slot can be associated with an index. The first (leftmost) bit corresponds to the slot index 0, the second bit corresponds to the slot index 1, and so on. Value 0 of a bit in the bitmap indicates that the corresponding slot is not available for sidelink usage. Value X (X>0) of a bit indicates that the corresponding slot is available for sidelink usage. In addition, the different X values (X>1) may indicate different sets of symbols within a slot available for sidelink usage. For example, X=1 (i.e., "01") means all symbols in the corresponding slot are available for sidelink usage. X=2 (i.e., "10") means one set of symbols in the corresponding slot are available for sidelink usage. X=3 (i.e., "11") means another set of symbols in the corresponding slot are available for sidelink usage.

In an example, a bitmap representing 10 slots within a period can be "10000 00001", which means only the first slot and the last slot every 10 slots (or every M ms) are available for sidelink usage. For another example, the bitmap representing 10 slots with 2 bits corresponding to one slot can be "00 00 00 00 00 00 00 01 10 11", which means only the last three slots every 10 slots are available for sidelink usage and have different sets of symbols in the respective slot available for sidelink usage. In this case, 2 bits corresponding to one slot can support indicating of a maximum of 2^2=4 states corresponding to each slot. Moreover, it can be L bits corresponding to one slot with up to 2 states for each slot.

In an example, a sidelink slot bitmap can be constructed in the way that one bit (or L bits) corresponds to a set of slots. For example, the first/leftmost bit (or the first/leftmost L bits with 2^L state) corresponds to the slot indices 0~N-1 within a period, the second bit (or the second L bits from bit L~2L-1) corresponds to the slot index N~2N-1, and soon. Value 0 in the bitmap indicates that the corresponding slots are not available for sidelink usage. Value X (X>0) indicates that the corresponding slots are available for sidelink usage. The different X values (X>1) may indicate different sets of symbols in each slot belonging to the set of slots available for sidelink usage. For example, X=1 (i.e., "01") indicates all symbols in the slot belonging to the respective set of slots are available for sidelink usage. X=2 (i.e., "10") indicates one particular set of symbols in the slot belonging to the respective set of slots are available for sidelink usage. X=3 (i.e., "11") indicates another particular set of symbols in the slot belonging to the respective set of slots are available for sidelink usage.

For each X value, another parameter or a (pre-)configured mapping table defining a mapping relationship between an X value and a set of available sidelink symbols in a slot can be provided to a UE. Table 1 shows an example of the mapping table. Based on the mapping relationship, the UE can determine which set of the symbols are available for sidelink usage in the corresponding slot with value X. A bitmap with one bit corresponding to one symbol can be used to indicate the set of symbols available for sidelink usage. The first/leftmost bit corresponds to the symbol index 0 within a slot. Value 0 in the bitmap indicates that the corresponding symbol is not available for sidelink usage. Value 1 indicates that the corresponding symbol is available for sidelink usage.

TABLE 1

| X value | Bitmap of a slot (e.g., 14 symbols per slot) |
|---|---|
| 0 | All symbols in the slot are not available for SL |
| 1 | All symbols in the slot are available for SL |
| 2 | 00111111110000 (symbols 2~9 are available for SL) |
| 3 | 00001111000000 (symbols 4~7 are available for SL) |
| 4 | 00101010100000 (symbols 2/4/6/8 are available for SL) |

In another example, resource indicator values (RIVs) typically used for frequency resource allocation can be used to indicate a starting symbol and consecutive symbols in a slot that are available for sidelink usage. For example, RIVs can be derived based on the total number of symbols per slot, the starting symbol in a slot for sidelink usage and the number of consecutive symbols for sidelink usage in the slot.

For example, RIVs for indicating a locations and a length of sidelink symbols for sidelink usage can be derived based on the following expressions:

If $(Lsymbols-1)<=floor(Nslotsymbol/2)$ then $[RIV=Nslotsymbol(Lsymbols-1)+Symbolstart]$ Else $[RIV=Nslotsymbol(Nslotsymbol-Lsymbols+1)+(Nslotsymbol-1-Symbolstart)]$ Where, Nslotsymbol represents the number of total symbols in a slot (or the number of total symbols in a slot by excluding the last symbol(s) reserved for GP in the slot);

Lsymbols represents the number of consecutive symbols for SL usage;

Symbolstart represents the starting symbol within a slot.

As an example, a mapping between an X value and an RIV value indicating a set of available sidelink symbols can be established Table 2. Such a mapping table can be pre-configured to a UE, signaled to a UE in an SIB message, an RRC message, or an S-SSB, or can be pre-defined (e.g., standardized).

TABLE 2

| X value | RIV value indicating SL symbols in a slot |
|---|---|
| 2 | 109 (Total 14 symbols per slot with 8 symbols for SL usage starting from symbol 2) |

Figure 8:
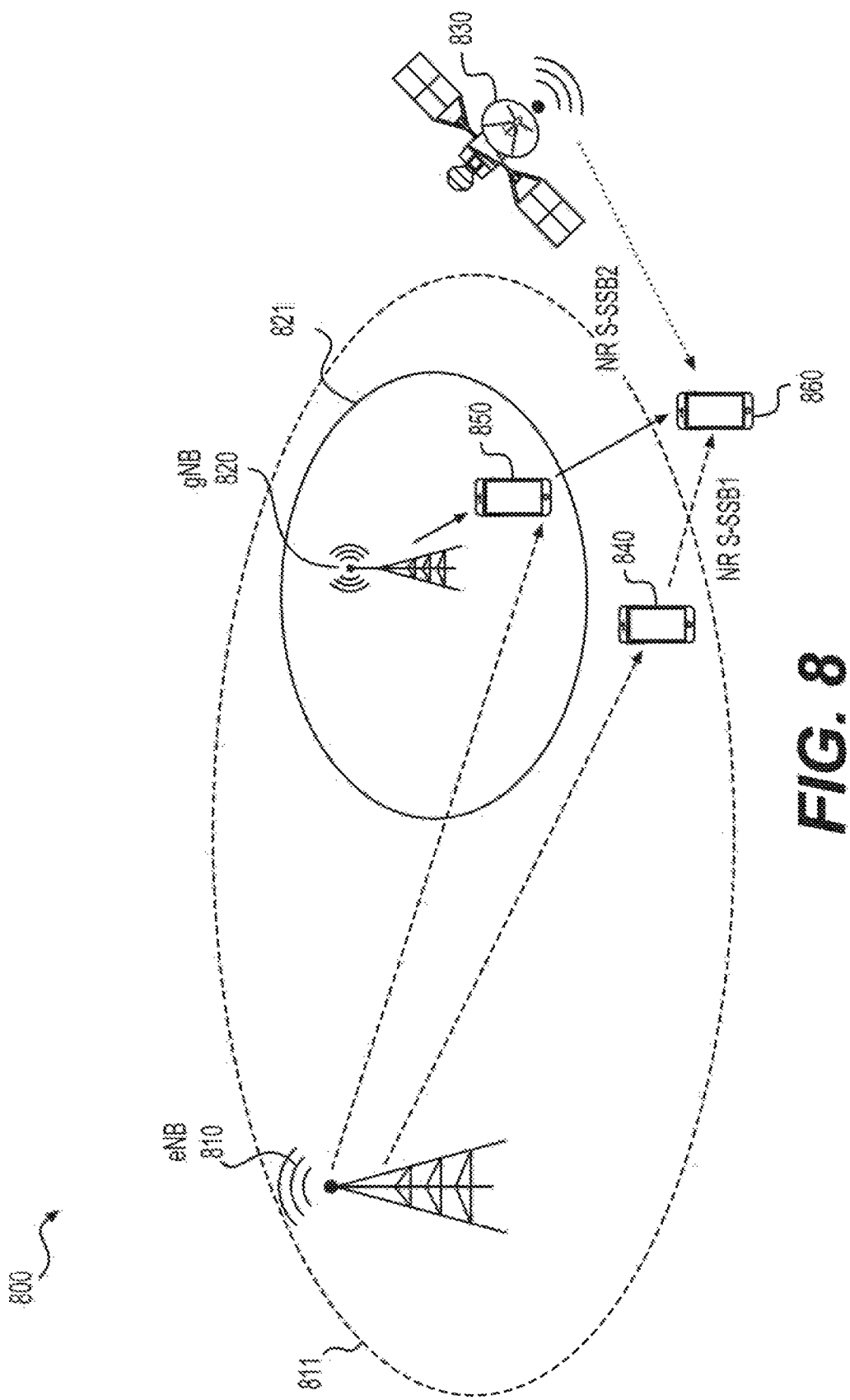
FIG. 8 shows an example communication system 800.

FIG. 8 shows an example communication system 800. The system 800 can include an eNB 810, a gNB 820, a global navigation satellite system (GNSS) 830, and three UEs 840/850/860. The eNB 810 can be a base station implementing the Evolved Universal Terrestrial Radio Access (E-UTRA) air interface of the 3GPP Long Term Evolution (LTE) standards. The gNB 820 can be a base station implementing the New Radio (NR) air interface of the 3GPP 5G standards. The eNB 810 can form a first coverage 811, while the gNB 820 can form a second coverage 821 overlapping the first coverage 811.

The UE 840 can be within the coverage 811 of the eNB 810 and out of the coverage 821 of the gNB 820. The UE 840 can be in RRC connected mode, or RRC idle mode. While in RRC connected mode with the eNB 810, the UE 840 can employ a carrier aggregation (CA) mechanism, and communicate with the eNB 810 via a group of cells including a primary cell (PCell) and one or more secondary cells (SCells). A component carrier (CC) of the PCell is referred to as a primary component carrier (PCC), while a CC of one of the secondary cells is referred to as a secondary component carrier (SCC).

In addition, while in RRC connected mode, the UE 840 can perform sidelink communications over a sidelink carrier that is one of the PCC or SCCs, or that is none of the PCC or SCCs. When the sidelink carrier is none of the PCC or SCCs, the UE 840 is said to be operating in an in-coverage state with a serving cell on a non-sidelink CC but in an out-of-coverage state with a sidelink carrier. Similarly, while in RRC idle mode, the UE 840 can be in an in-coverage state with a cell the UE 840 camps on but in an out-of-coverage state with a sidelink carrier.

As shown, the UE 840 may use the eNB 810 as a synchronization source for sidelink transmissions and transmit a first NR S-SSB (shown as NR S-SSB1) accordingly.

The UE 850 can operate in a dual connectivity (DC) mode (e.g., Evolved Universal Terrestrial Radio Access Network (E-UTRAN) NR dual connectivity (EN-DC) mode). In the DC mode, the UE 850 may use one of the eNB 810 and gNB 820 as a master node, and the other one of the eNB 810 and gNB 820 as a secondary node. A primary cell group (PCG) can be established between the UE 850 and the master node, while a secondary cell group (SCG) can be established between the UE 850 and the secondary node. A primary cell in the PCG is called a PCell. A primary cell in the SCG is called a PSCell. Other secondary cells in the PCG or SCG is called an SCell. A CC of a PSCell is called a primary SCG component carrier (PSCC).

Similarly, the UE 850 can operate in an in-coverage state with a serving cell (e.g., a PCell) but in an out-of-coverage stage with a sidelink carrier that is not a CC of the PCell, PSCell, or SCells.

For purpose of sidelink communications, the UE 850 can select one of the PCell, PSCell, or SCell as a synchronization source, and transmit a second NR S-SSB (shown as NR S-SSB2) accordingly.

The UE 860 is out of the coverage of the eNB 810 and the gNB 820. The UE 860 can receive the first and second NR S-SSB signals from the UE 840 and the UE 850. In addition, the UE 860 can receive signals from the GNSS 830. Accordingly, the UE 860 may select one of the UE 840, the UE 850, and the GNSS 830 as a synchronization reference source for sidelink communications.

Figure 9:
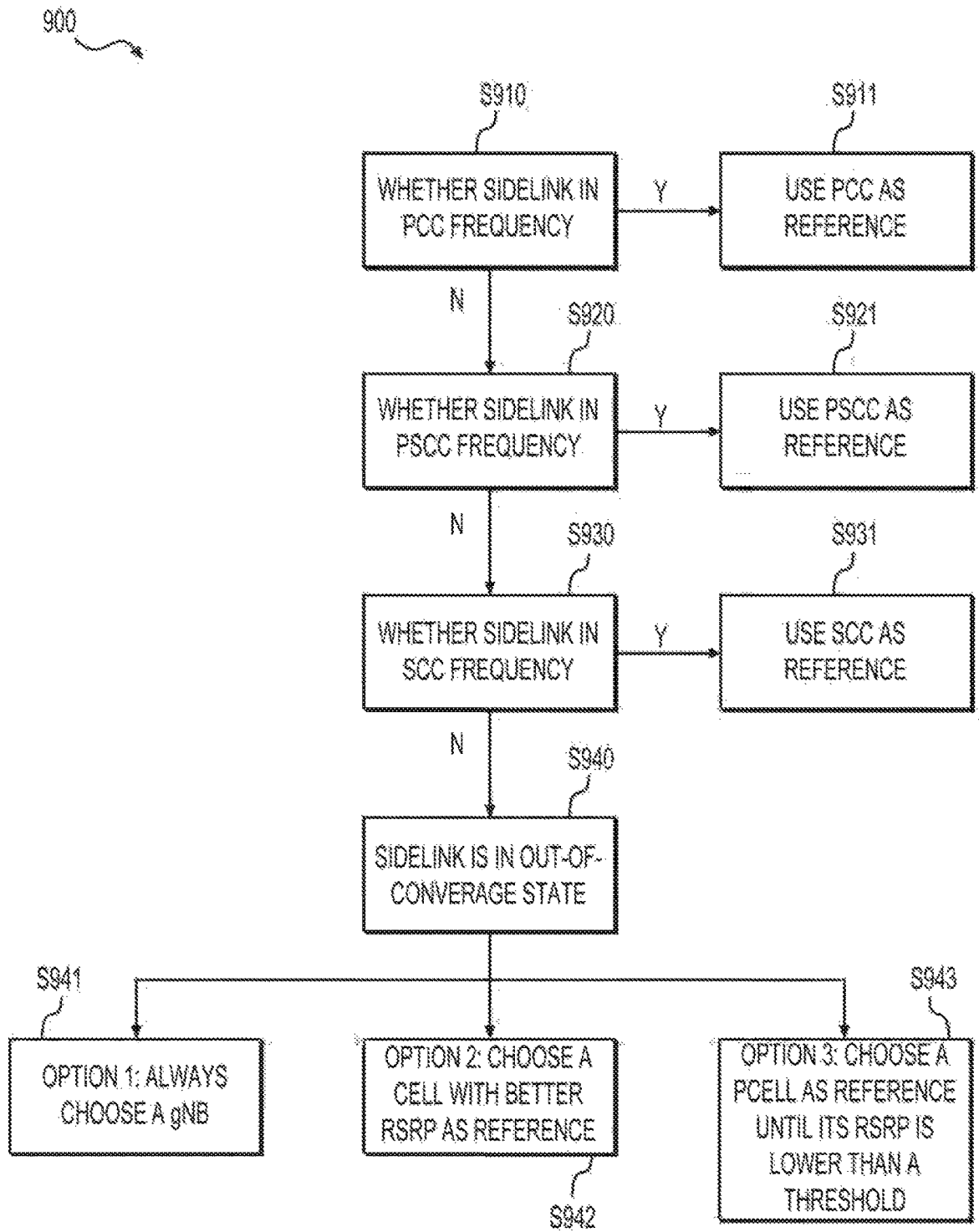
FIG. 9 shows an example process 900 of sidelink synchronization source selection according to some embodiments of the disclosure.

FIG. 9 shows an example process 900 of sidelink synchronization source selection according to some embodiments of the disclosure. A UE, referred to as a selection UE, in a DC mode can perform the process 900 to determine a synchronization source for a sidelink of the selection UE. The DC mode can be a EN-DC mode, a NR E-UTRAN dual connectivity (NE-DC) mode, a NR-DC mode, or the like. While operating in the DC mode, the selection UE can have a PCell on a PCC associated with a master node, a PSCell on a PSCC associated with a secondary node, and one or more SCells on respective SCCs. The process 900 can start from S910.

At 910, whether the sidelink of the selection UE operates in a PCC frequency can be determined. When the sidelink operates in the PCC frequency of the PCell, the process 900 proceeds to S911. Otherwise, the process 900 proceeds to S920. At S911, the selection UE can determine to use the PCell as the synchronization source (or reference) for the sidelink.

At S920, whether the sidelink operates in a PSCC frequency can be determined. When the sidelink operates in the PSCC frequency of the PSCell, the process 900 proceeds to S921. Otherwise, the process 900 proceeds to S930. At S921, the selection UE can determine to use the PSCell as the synchronization source for the sidelink.

At S930, whether the sidelink operates in an SCC frequency can be determined. When the sidelink operates in the SCC frequency of an SCell, the process 900 proceeds to S931. Otherwise, the process 900 proceeds to S940. At S931, the selection UE can determine to use the SCell as the synchronization source for the sidelink.

At 940, the sidelink can be determined to be operating in an out-of-coverage state with a sidelink frequency different from that of any of the PCell, PSCell, or SCells. In different embodiments, one of three options at S941-S943 can be adopted when the sidelink is in the out-of-coverage state.

Option 1 (S941): The selection UE prefers a gNB cell over an eNB cell because a gNB typically has a better timing accuracy than an eNB. In an example, when both the PCell and the PSCell are gNBs or eNBs, the selection UE can select one of the PCell or PSCell as the synchronization source based on signal qualities of the PCell and PSCell. For example, the signal quality can be indicated by an RSRP measurement. In an example, when both the PCell and the PSCell are gNBs or eNBs, UE can select the PCell as the synchronization reference.

Option 2 (S942): The selection UE can select the synchronization reference based on a signal quality (e.g., RSRP) of a cell because a cell with a better signal quality can be more reliable for providing a reference timing. The cell with a better signal quality can be a PCell, a PSCell associated with either an eNB or a gNB.

Option 3 (S943): In an embodiment, the selection UE can select the PCell as the synchronization source until a signal quality (e.g., RSRP) is below a threshold. The PCell can be associated with either an eNB or a gNB. In an embodiment, the selection UE can select one of the master node and the secondary node as the synchronization reference source when both the PCell and the PSCell's quality (e.g., RSRP) are above a threshold. In an example, the UE can select the gNB as the synchronization source. When both the PCell and the PSCell are associated with gNBs or eNBs, the selection UE can select a cell with a better quality (e.g., RSRP) as the synchronous reference. In another example, when both the PCell and the PSCell are associated with gNBs or eNBs, the selection UE can select the PCell as the synchronous reference. When the quality of any of the PCell or the PSCell is lower than the threshold, the selection UE can determine this cell is unreliable. For example, in the FIG. 8 example, signal qualities of both the gNB 820 and the eNB 810 for the UE 840 can be worse than a threshold. In this case, the selection UE can select the cell with a better quality (e.g., RSRP).

Figure 10:
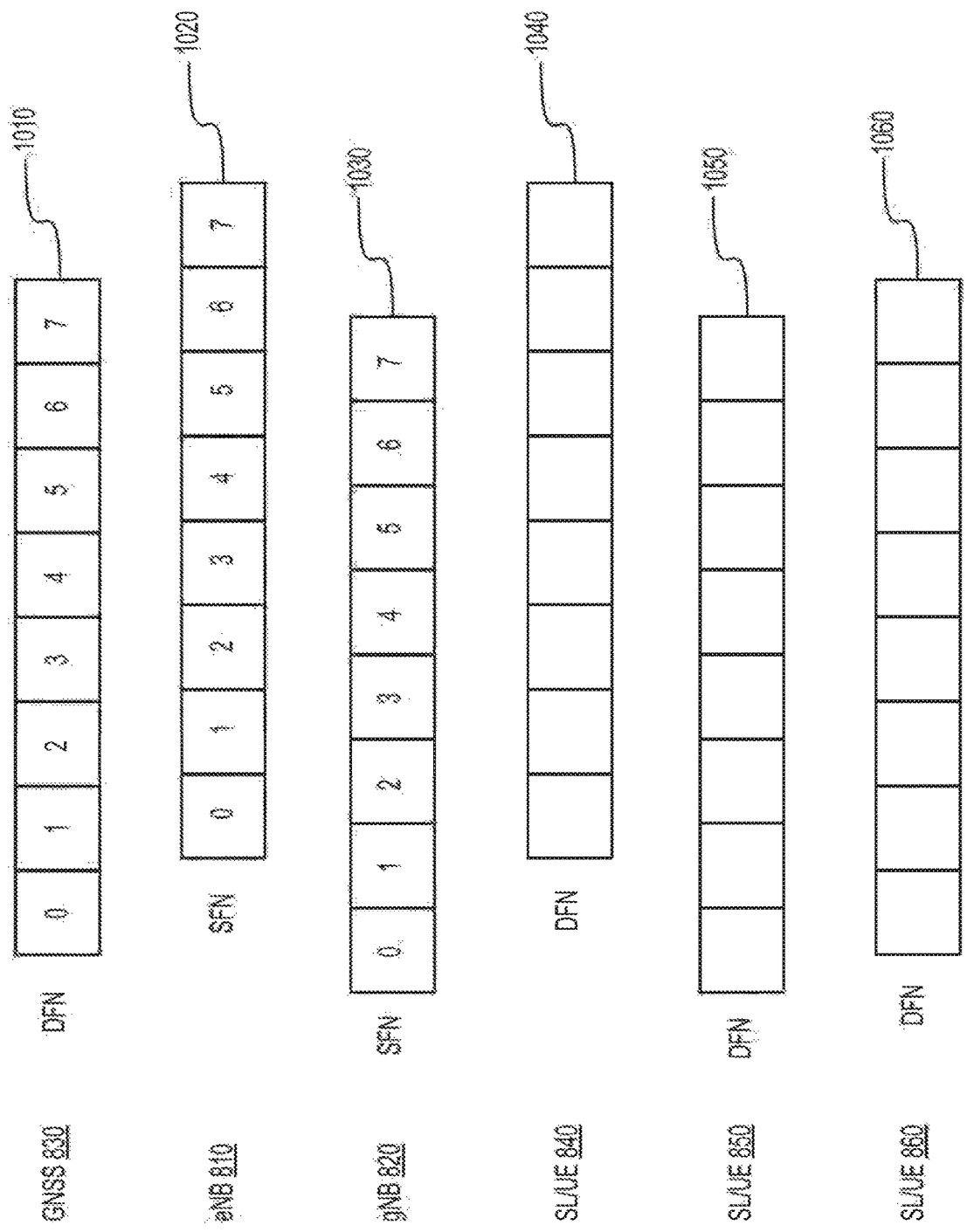
FIG. 10 shows timings of different elements of the system 800 according to some embodiments of the disclosure.

FIG. 10 shows timings of different elements of the system 800 according to some embodiments of the disclosure. As shown, the GNSS 830 has a timing 1010 represented by a sequence of data frames each associated with a data frame number (DFN) from 0 to 7. The eNB 810 has a timing 1020 represented by a sequence of data frames each associated with a system frame number (SFN) from 0 to 7. The gNB 820 has a timing 1030 represented by a sequence of data frames each associated with a SFN from 0 to 7. As shown, the three timings 1010-1030 are asynchronous with each other.

The UE 840 uses the eNB 810 as a synchronization source for sidelink transmissions. Accordingly, the UE 840 has a sidelink timing 1040 synchronized with the timing 1020 of the eNB 810. The UE 850 uses the gNB 820 as a synchronization source for sidelink transmissions. Accordingly, the UE 850 has a sidelink timing 1050 synchronized with the timing 1030 of the gNB 820. The UE 860 uses the GNSS 830 as a synchronization source for sidelink transmissions. Accordingly, the UE 860 has a sidelink timing 1060 synchronized with the timing 1030 of the GNSS 830.

The UEs 840/850/860 may try to exchange data with each other using sidelinks. However, as shown in FIG. 10, the sidelink timings 1040/1050/1060 of the UEs 840/850/860 are asynchronous with each other. Pairs among the UEs 840/850/860 can adjust the respective sidelink timings to become synchronized with each other in order to communicate with each other.

Mechanisms for adjust sidelink synchronization timings are described below.

In an embodiment, a first UE, denoted UE1, is in-coverage with a first serving cell and operates a sidelink(s) that shares a same carrier with a Uu interface of the first UE. A second UE, denoted UE2, is in-coverage with a second serving cell and operates a sidelink(s) that shares a same carrier with a Uu interface of the second UE. The first and second serving cell can be the same cell or different cells in different scenarios. There can be 4 scenarios for UE1 and UE2's sidelink synchronization status:

(1) UE1 synchronizes with a gNB, UE2 synchronizes with a GNSS;
(2) Both UE1 and UE2 synchronize with a GNSS;
(3) UE1 and UE2 synchronize with two gNBs (or eNBs), respectively, and the two gNBs (or eNBs) synchronize with each other;
(4) UE1 synchronizes with a first gNB (or eNB), while UE2 synchronizes with a second gNB (or eNB), the first and second gNBs (or eNBs) being asynchronized.

In scenarios (1), a network serving UE1 and UE 2 can configure a symbol level timing offset to UE2 to avoid the collision between a sidelink between UE1 and UE 2 and an uplink of UE1 or UE2. For example, UE2 can resynchronize with the timing of the gNB based on the configured symbol level timing offset.

In scenarios (2), a network serving UE1 and UE2 can configure a symbol level timing offset to UE1 and UE2 to avoid the collision between a sidelink between UE1 and UE 2 and an uplink of UE1 or UE2. For example, UE1 and UE2 can resynchronize with the timing of the network based on the configured symbol level timing offset.

In scenario (3), there is no problem for UE1 and UE2's communication when both UE1 and UE2 are synchronized.

In scenario (4), problems arise that either a sidelink between UE1 and UE2 possibly collides with an uplink or UE1 and UE2 cannot communicate over a sidelink. One option is that the network can configure using a GNSS as a synchronization source when the network deployment is asynchronous. Another option to guarantee the communication between UE1 and UE2 in asynchronous network is that UE1 and UE2 synchronize to an GNSS by default (e.g., standardized). The eNB and gNB can configure a timing difference between a GNSS and a timing of the eNB or gNB.

Owing to an eNB and gNB timing difference can be larger than 1 slot, the network can configure both a slot level offset and a symbol level offset to UE1 and UE2, for example, by RRC signaling, MAC-CE, or DCI, such as extend DFN offset range, to support longer slots. After that, UE1 and UE2 can adjust to align with the GNSS. For example, a DFN offset could be set from 0 to 10000 with 1 μs as the granularity. UE or UE2 can decide whether sidelink or uplink signals are to be dropped when sidelink signals collide with uplink signals after the timing shift based on a priority rule. For example, the priority rule can specify a sidelink signals' priority with respect to a priority of the uplink signals.

In an embodiment, a first UE, denoted UE3, is in-coverage with a first serving cell and operates a sidelink(s) over a sidelink carrier different from CCs of a Uu interface of UE3 (out-of-coverage on a sidelink carrier). A second UE, denoted UE4, is in-coverage with a second serving cell and operates a sidelink(s) that is out-of-coverage on a sidelink carrier. The first and second serving cell can be the same cell or different cells. There can be 4 scenarios for UE3 and UE4's sidelink synchronization status:

(1) UE3 synchronizes with an eNB, and UE4 synchronizes with a GNSS;
(2) UE3 synchronizes with a GNSS, and UE4 synchronizes with the GNSS;
(3) UE3 synchronizes with an eNB, and UE4 synchronizes with a gNB;
(4) UE3 synchronizes with a GNSS, and UE4 synchronizes with a gNB.

In scenario (1), a network serving UE3 and UE4 can configure a symbol level timing offset between the eNB and the GNSS to UE3 or UE4 such that one of the UE3 or UE4 can adjust its timing to become synchronized with the other one of the UE3 or UE4. In an embodiment, the eNB is preferred as the synchronization source. UE4 adjusts it timing to synchronize with the timing of the eNB.

In scenario (4), similarly, the network can configure a symbol level timing offset between the GNSS and the gNB to UE3 or UE4 such that one of the UE3 or UE4 can adjust its timing to become synchronized with the other one of the UE3 or UE4. In an embodiment, the gNB is preferred as the synchronization source. UE3 adjusts it timing to synchronize with the timing of the gNB.

In scenario (2), there is no problem for UE3 and UE4's sidelink communications.

In scenario (3), problems arise when the eNB and the gNB are asynchronized with each other. A timing difference between the eNB and the gNB can be up to 500 μs including a slot level timing difference and a symbol level timing difference. One option is that both UE3 and UE4 can synchronizes with a GNSS. The eNB and gNB can configure the timing difference between the GNSS and the timing of the eNB or gNB even the eNB and the gNB belongs to a same operator.

Owing to the eNB and gNB timing difference can be larger than 1 slot, the network can configure both a slot level offset and a symbol level offset to UE3 and UE4 by RRC signaling, or MAC-CE, or DCI, such as extend DFN offset range, to support longer slots. Thereafter, UE3 and UE4 can adjust their timing to align with the GNSS. For example, a DFN offset can be set from 0 to 10000 with 1 μs as the granularity. UE3 and UE4 can decide which one to drop when sidelink signals collide with uplink signals after the timing shift based on a priority rule. For example, the priority rule can be based on a sidelink signals' priority with respect to a priority of uplink signals.

Figure 11:
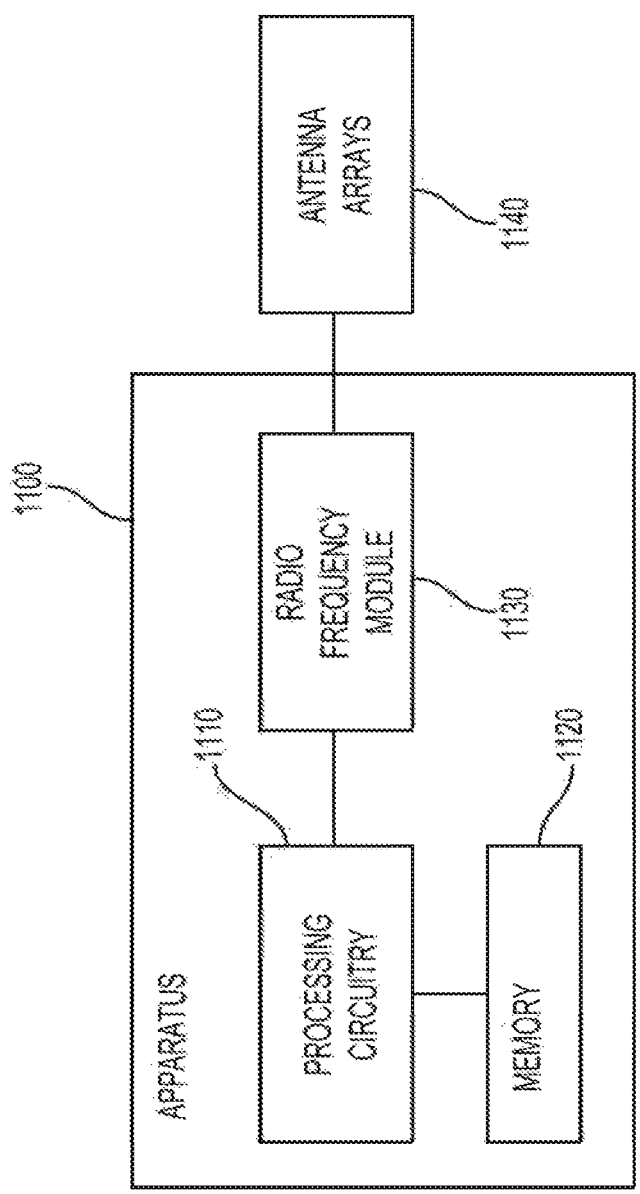
FIG. 11 shows an apparatus 1100 according to embodiments of the disclosure.

FIG. 11 shows an exemplary apparatus 1100 according to embodiments of the disclosure. The apparatus 1100 can be configured to perform various functions in accordance with one or more embodiments or examples described herein. Thus, the apparatus 1100 can provide means for implementation of mechanisms, techniques, processes, functions, components, systems described herein. For example, the apparatus 1100 can be used to implement functions of UEs or BSs in various embodiments and examples described herein. The apparatus 1100 can include a general purpose processor or specially designed circuits to implement various functions, components, or processes described herein in various embodiments. The apparatus 1100 can include processing circuitry 1110, a memory 1120, and a radio frequency (RF) module 1130.

In various examples, the processing circuitry 1110 can include circuitry configured to perform the functions and processes described herein in combination with software or without software. In various examples, the processing circuitry 1110 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1110 can be a central processing unit (CPU) configured to execute program instructions to perform various functions and processes described herein. Accordingly, the memory 1120 can be configured to store program instructions. The processing circuitry 1110, when executing the program instructions, can perform the functions and processes. The memory 1120 can further store other programs or data, such as operating systems, application programs, and the like. The memory 1120 can include non-transitory storage media, such as a read only memory (ROM), a random access memory (RAM), a flash memory, a solid state memory, a hard disk drive, an optical disk drive, and the like.

In an embodiment, the RF module 1130 receives a processed data signal from the processing circuitry 1110 and converts the data signal to beamforming wireless signals that are then transmitted via antenna arrays 1140, or vice versa. The RF module 1130 can include a digital to analog converter (DAC), an analog to digital converter (ADC), a frequency up converter, a frequency down converter, filters and amplifiers for reception and transmission operations. The RF module 1130 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1140 can include one or more antenna arrays.

The apparatus 1100 can optionally include other components, such as input and output devices, additional or signal processing circuitry, and the like. Accordingly, the apparatus 1100 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

Please note that Use of ordinal terms such as "first," "second" etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving at a user equipment (UE) a first configuration for a first resource pool, the first configuration indicating first size information of a first first-stage sidelink control information (SCI) to be transmitted from the UE utilizing resources of the first resource pool, the first size information including a first size of the first first-stage SCI in terms of a number of orthogonal frequency division multiplexing (OFDM) symbols and a second size of the first first-stage SCI in terms of a number of physical resource blocks (PRBs), the first resource pool being divided into slots in time domain and sub-channels each occupying a set of PRBs in frequency domain; and
   transmitting, from the UE, utilizing the resources of the first resource pool based on the first size information of the first first-stage SCI in the first configuration for the first resource pool, the first first-stage SCI having the first size of the number of OFDM symbols and the second size of the number of PRBs indicated by the first configuration for the first resource pool, the first first-stage SCI being transmitted within a first slot and a first sub-channel of the first resource pool.

2. The method of claim 1, wherein the number of OFDM symbols indicated by the first configuration for the first resource pool includes one of 2 OFDM symbols and 3 OFDM symbols.

3. The method of claim 1, wherein the first first-stage SCI starts from a second OFDM symbol of the first slot in time domain.

4. The method of claim 1, wherein the first first-stage SCI starts from a lowest PRB of the first sub-channel in frequency domain.

5. The method of claim 1, wherein the receiving includes:
receiving the first configuration for the first resource pool from a base station or a memory in the UE.

6. The method of claim 1, further comprising:
receiving at the UE a second configuration for a second resource pool, the second configuration indicating second size information of a second first-stage SCI to be received at the UE in resources of the second resource pool, the second size information including a third size of the second first-stage SCI in terms of a number of OFDM symbols and a fourth size of the second first-stage SCI in terms of a number of PRBs, the second resource pool being divided into slots in time domain and sub-channels each occupying a set of PRBs in frequency domain; and
receiving, at the UE, based on the second configuration for the second resource pool and in the resources of the second resource pool, the second first-stage SCI having the third size of the number of OFDM symbols and the fourth size of the number of PRBs indicated by the second configuration for the second resource pool, the second first-stage SCI being received within a second slot and a second sub-channel of the second resource pool.

7. The method of claim 6, wherein the number of OFDM symbols indicated by the second configuration for the second resource pool includes one of 2 OFDM symbols and 3 OFDM symbols.

8. An apparatus, comprising circuitry configured to:
receive at a user equipment (UE) a first configuration for a first resource pool, the first configuration indicating first size information of a first first-stage sidelink control information (SCI) to be transmitted from the UE utilizing resources of the first resource pool, the first size information including a first size of the first first-stage SCI in terms of a number of orthogonal frequency division multiplexing (OFDM) symbols and a second size of the first first-stage SCI in terms of a number of physical resource blocks (PRBs), the first resource pool being divided into slots in time domain and sub-channels each occupying a set of PRBs in frequency domain; and
transmit, from the UE, utilizing the resources of the first resource pool based on the first size information of the first first-stage SCI in the first configuration for the first resource pool, the first first-stage SCI having the first size of the number of OFDM symbols and the second size of the number of PRBs indicated by the first configuration for the first resource pool, the first first-stage SCI being transmitted within a first slot and a first sub-channel of the first resource pool.

9. The apparatus of claim 8, wherein the number of OFDM symbols indicated by the first configuration for the first resource pool includes one of 2 OFDM symbols and 3 OFDM symbols.

10. The apparatus of claim 8, wherein the first first-stage SCI starts from a second OFDM symbol of the first slot in time domain.

11. The apparatus of claim 8, wherein the first first-stage SCI starts from a lowest PRB of the first sub-channel in frequency domain.

12. The apparatus of claim 8, wherein the circuitry is further configured to:
receive the first configuration for the first resource pool from a base station or a memory in the UE.

13. The apparatus of claim 8, wherein the circuitry is further configured to:
receive at the UE a second configuration for a second resource pool, the second configuration indicating second size information of a second first-stage SCI to be received at the UE in resources of the second resource pool, the second size information including a third size of the second first-stage SCI in terms of a number of OFDM symbols and a fourth size of the second first-stage SCI in terms of a number of PRBs, the second resource pool being divided into slots in time domain and sub-channels each occupying a set of PRBs in frequency domain; and
receive, at the UE, based on the second configuration for the second resource pool and in the resources of the second resource pool, the second first-stage SCI having the third size of the number of OFDM symbols and the fourth size of the number of PRBs indicated by the second configuration for the second resource pool, the second first-stage SCI being received within a second slot and a second sub-channel of the second resource pool.

14. The apparatus of claim 13, wherein the number of OFDM symbols indicated by the second configuration for the second resource pool includes one of 2 OFDM symbols and 3 OFDM symbols.

15. A non-transitory computer-readable medium storing instructions that, when executed by a processor, cause the processor to perform a method, the method comprising:
receiving at a user equipment (UE) a first configuration for a first resource pool, the first configuration indicating first size information of a first first-stage sidelink control information (SCI) to be transmitted from the UE utilizing resources of the first resource pool, the first size information including a first size of the first first-stage SCI in terms of a number of orthogonal frequency division multiplexing (OFDM) symbols and a second size of the first first-stage SCI in terms of a number of physical resource blocks (PRBs), the first resource pool being divided into slots in time domain and sub-channels each occupying a set of PRBs in frequency domain; and
transmitting, from the UE, utilizing the resources of the first resource pool based on the first size information of the first first-stage SCI in the first configuration for the first resource pool, the first first-stage SCI having the first size of the number of OFDM symbols and the second size of the number of PRBs indicated by the first configuration for the first resource pool, the first first-stage SCI being transmitted within a first slot and a first sub-channel of the first resource pool.

16. The non-transitory computer-readable medium of claim 15, wherein the number of OFDM symbols indicated by the first configuration for the first resource pool includes one of 2 OFDM symbols and 3 OFDM symbols.

17. The non-transitory computer-readable medium of claim 15, wherein the first first-stage SCI starts from a second OFDM symbol of the first slot in time domain.

18. The non-transitory computer-readable medium of claim 15, wherein the first first-stage SCI starts from a lowest PRB of the first sub-channel in frequency domain.

19. The non-transitory computer-readable medium of claim 15, wherein the receiving includes:

receiving the first configuration for the first resource pool from a base station or a memory in the UE.

20. The non-transitory computer-readable medium of claim 15, wherein the method further comprises:

receiving at the UE a second configuration for a second resource pool, the second configuration indicating second size information of a second first-stage SCI to be received at the UE in resources of the second resource pool, the second size information including a third size of the second first-stage SCI in terms of a number of OFDM symbols and a fourth size of the second first-stage SCI in terms of a number of PRBs, the second resource pool being divided into slots in time domain and sub-channels each occupying a set of PRBs in frequency domain; and receiving, at the UE, based on the second configuration for the second resource pool and in the resources of the second resource pool, the second first-stage SCI having the third size of the number of OFDM symbols and the fourth size of the number of PRBs indicated by the second configuration for the second resource pool, the second first-stage SCI being received within a second slot and a second sub-channel of the second resource pool.

\* \* \* \* \*